Patented Jan. 8, 1946

2,392,554

UNITED STATES PATENT OFFICE 2,392,554

MANUFACTURE OF MERCAPTANS

Walter A. Schulze, Bartlesville, Okla., assignor to Phillips Petroleum Company, a corporation of Delaware No Drawing. Application July 3, 1943,
Serial No. 493,464

4 Claims. (Cl. 260—609)

This invention relates to the manufacture of high-boiling sulfur compounds of exceptional value as modifiers in the manufacture of synthetic rubber. More specifically this invention relates to the manufacture of high-molecular weight sulfur compounds through the direct union of hydrogen sulfide with olefinic hydrocarbons of 8 or more carbon atoms in the presence of a solid contact catalyst. In a specific embodiment this invention involves the introduction of a novel depolymerization operation in the aforesaid synthesis by means of which high boiling mercaptans of exceptional stability, uniform characteristics and superior qualities are produced.

The reaction between hydrogen sulfide and olefinic hydrocarbons to produce mercaptans, with or without the presence of a catalyst, is an established reaction. Heretofore the application of the reaction has followed two general routes: (1) reaction between hydrogen sulfide and olefin at moderate temperatures to yield mercaptans having a hydrocarbon residue corresponding to the olefin along with thioethers and other secondary reaction products; (2) olefinhydrogen sulfide reaction under relatively severe thermal conditions to yield mercaptans having a fewer number of carbon atoms than the olefin charge. In the latter type of reaction at temperatures in excess of 500° F. thioethers and saturated hydrocarbons tend to predominate among the reaction products.

An object of this invention is to react olefins with hydrogen sulfide. Another object of this invention is to produce organic sulfur compounds. Another object of the present invention is to react hydrogen sulfide and olefinic hydrocarbons of 8 or more carbon atoms over a solid contact catalyst in such a manner as to yield mercaptans corresponding in chain length to the olefins. Another object of the invention is to effect the aforesaid reaction over a silica-alumina, or other suitable contact catalyst, under conditions leading to mercaptans of superior stability and of a high degree of purity. A further object is the provision of an improved olefin feed stock in the operation of said process by the utilization of partial and selective depolymerizing conditions to effectively reduce the proportions of less desirable olefin isomers and/or mercaptans from the final reaction product. Other objects and advantages of this invention will become apparent, to one skilled in the art, from the accompanying disclosure and discussion.

In accordance with this invention a selected olefinic mixture of 8 or more carbon atoms, such as high boiling butylene or propylene-butylene polymer fractions in admixture with hydrogen sulfide and with or without the presence of inert diluent is treated in a catalyst chamber containing a silica-alumina type catalyst or its equivalent. Conditions of temperature, pressure, flowrate and catalyst activity are selected so as to catalyze both depolymerization and mercaptan synthesis and thereby effect the decomposition of less stable components of the olefin feed without interfering with the mercaptan reaction involving the more stable olefins. This method of mercaptan synthesis may be carried out as a single or two-stage reaction. If a two stage treatment is preferred, the olefin feed may be contacted with the same or different catalyst of suitable depolymerizing activity under mild depolymerization conditions, and the heavy olefin separated from light products of depolymerization prior to the second stage reaction producing mercaptans. This latter mode of operation is advantageous in that light products, including valuable light olefins and aviation gasoline components, are recovered uncontaminated with sulfurcompounds and higher conversion per pass may be realized in the mercaptan-forming reaction.

A specific embodiment of the single stage application of this invention involves treatment of a mixed propylene-butylene polymer fraction with hydrogen sulfide over a catalyst of suitable activity for concurrent depolymerization and mercaptan synthesis. The olefin fraction, boiling between 335-360° F., is admixed with hydrogen sulfide to give a feed composition corresponding to about 1 to 2 mols of hydrogen sulfide per mol of olefin. The reactants are introduced into the catalyst zone under a pressure of 400 to 500 p. s. i. at a flow-rate of 1 liquid volume per volume of catalyst per hour and the reaction temperature is held between 300-350° F. This treatment results in the selective depolymerization of less stable olefin isomers but does not depolymerize the more stable mixed propylene-butylene polymers. Hydrogen sulfide and low-boiling mercaptans, and/or olefins, are flashed from the effluent and the unreacted heavy polymer is removed from the high molecular weight mercaptan product by means of a stripping operation under diminished pressure, or by solvent extraction or other suitable means.

A variation of this invention provides for pretreatment of the olefin feed over a suitable catalyst under conditions promoting the desired extent of depolymerization in the absence of hydrogen sulfide. Thus a mixed propylene-butylene polymer feed containing a mixture of olefins of 11 to 14 carbon atoms is charged to the reaction zone under a pressure of about 50 to 100 p. s. i. and temperatures of from 500–600° F. Under these conditions selective depolymerization of the less refractory olefins occurs while the more refractory olefins pass through the reaction zone without undergoing substantial depolymerization. After stabilization to remove lighter products formed in depolymerization the higher olefins are charged, with hydrogen sulfide, to a second catalytic zone wherein the mercaptan-forming reactions are effected. Reaction conditions in the second zone are usually maintained so that a relatively high per cent of the olefin feed is converted to high-boiling mercaptan per pass.

The process of this invention is particularly adapted to the utilization of high-boiling byproducts of catalytic codimer operation although high-boiling olefins from other sources are also applicable. Ordinarily polymers of propylene, butylenes and amylenes, as well as copolymers of these olefins, may be used. For example, polymer fractions boiling above 335° F. and having a boiling range within the limits of about 335 to 400° F. constitute suitable olefinic feed stock for synthesis of $C_{10}$ and higher mercaptans. Olefin isomers ranging from $C_{10}$ to $C_{16}$ may be included in this range, however the $C_{12}$ and $C_{13}$ olefins will ordinarily predominate. In such a mixture, the number of possible isomers is very great and the inclusion of relatively unstable olefinic material is unavoidable. The present process, by selectively eliminating the more unstable components of the feed, can operate with a wide variety of olefinic stock to produce mercaptans of uniform quality, high thermal stability and possessing other superior characteristics.

In the mercaptan synthesis step of the present process, it is ordinarily preferable to employ a molal excess of hydrogen sulfide with reference to the olefin content of the feed. In a single stage operation the hydrogen sulfide to olefin molal ratio is maintained between about 1.5:1 and 10:1 with the preferred range being between about 2:1 and 4:1. When the two stage operation is used, the olefin feed to the second stage mercaptan reaction is relatively more refractory toward cracking, hence more severe conditions may be employed to effect more complete reaction. With this mode of operation hydrogen sulfide-olefin mol ratios as low as about 1.1:1 to 2:1 have been successfully employed.

The flow-rates employed in this invention are selected to give adequate time for depolymerization of unstable olefins and/or mercaptans. Allowing for variations in types of feed stocks, the olefin-hydrogen sulfide mixture is charged at a rate of from 1 to 5 liquid volumes per volume of catalyst per hour with preferred range falling between 1.5 and 2.5. To further insure the production of a maximum proportion of improved mercaptans in single stage operation, a high polymer recycle rate is ordinarily employed with a relatively low conversion per pass.

Reaction temperatures in the single stage embodiment of this process may be somewhat more severe than those normally employed for maximum mercaptan production. However, since synthesis and purification are carried out simultaneously a reaction temperature range of about 250° F. to 350° F. is usually preferred. In most instances a temperature of about 300° F. is quite satisfactory.

In the two stage operation when the selective depolymerization and mercaptan synthesis are conducted in separate zones more severe conditions are employed in the olefin treating step. Thus the initial stage may employ temperatures of 400 to 800° F. with the preferred range depending on the source and composition of the olefin and the catalyst employed. In the subsequent mercaptan reaction temperatures between about 300 and 375° F. may be used to obtain the high degree of conversion possible with this mode of operation.

The catalysts which are useful in the present process are ordinarily solid adsorbent contact catalysts such as natural or activated clays and various synthetic gel-type silica-metal oxide compositions. Synthetic gel-type catalysts preferably comprise a major portion of silica and a minor portion (about 1 to about 5% by weight) of an oxide of a metal belonging to one of groups IIIB and IVA of the periodic system, including boron, aluminum, gallium, indium and thallium in group IIIB and titanium, zirconium, hafnium and thorium in group IVA. A preferred silica-alumina catalyst is prepared by contacting a hydrous silica gel with an aqueous solution of a hydrolyzable salt of aluminum to adsorb hydrous alumina, and subsequently washing and drying said treated gel.

The use of such catalysts to react olefins with hydrogen sulfide to form mercaptans is disclosed in my copending application Serial No. 493,463, filed July 3, 1943. Such catalysts, while not equivalents, may be employed to promote the desired degree of selective depolymerization concurrently with the condensation of $H_2S$ and olefins to produce mercaptans. When the process is conducted in two catalytic stages, the catalysts may be the same or different, depending on the nature of the feed stock, the respective conversion conditions and the products desired. Thus, for a preliminary depolymerization step, a catalyst of lower activity in promoting the condensation reaction may be more satisfactory and economical. Examples of catalysts for two stage operation are: (a) silica gel activated with metal oxide in both stages; (b) fuller's earth in the first stage and silica-alumina in the second; (c) fuller's earth in the first stage and solid phosphoric acid catalyst in the second stage.

Reaction pressures are selected to favor the desired depolymerization reaction without interfering seriously with the mercaptan reaction when these reactions are concurrent. Depending on the nature of the olefin feed, the reaction pressure may vary from 100 to 1000 p. s. i. With an ordinary copolymer charge, the pressure is usually held at from 500 to 1000 p. s. i.

In the segregated two stage process, low pressures of atmospheric to about 500 p. s. i. may be used in the olefin treating step while high pressures of about 1000 to 2000 p. s. i. are used to favor the mercaptan-forming reaction in the second stage.

In the practice of this invention to produce high quality mercaptans of superior stability in a single step, it is preferred to effect a low conversion per pass with continuous recycle of most of the total effluent. In this manner a high degree of purification can be effected without detriment to the desired products. The quantity of olefin converted to mercaptan per pass ordinarily is maintained between about 30 and 40 per cent.

For purposes of illustration, reference is herewith made to specific examples which typify suitable methods of executing the invention.

Example I

A 338–360° F. cut of heavy polymer from a catalytic polymerization plant charging refinery propylene and butylenes is admixed with hydrogen sulfide to give an olefin-$H_2S$ mol ratio of approximately 1:2. The feed is charged under a pressure of 500 pounds gage to a catalyst case containing silica-alumina catalyst at a flow-rate of 2 liquid volumes per volume of catalyst per hour. The temperature in the catalyst case is maintained at 290–300° F. Approximately 60–65 volume per cent of the effluent is recycled to the catalyst case. The product stream is passed through a pressure release valve and the hydrogen sulfide is largely removed in a flash drum. The last traces of $H_2S$ and the low-boiling mercaptans are removed by distillation under a partial vacuum. The unreacted heavy olefin is separated from the product mercaptan in a high-vacuum stripping operation.

| | |
|---|---|
| Per cent olefin converted per pass | 38 |
| Per cent yield of high-boiling mercaptans based on olefin converted | 66 |
| Boiling range of mercaptan product | 420–460° F. |
| Mercaptan sulfur content of product, weight per cent | 15.3 |

The stability of the product is reflected in the absence of decomposition during the distillation operations employed in purification process.

Example II

The heavy polymer fraction of Example I is subjected to a two stage mercaptan synthesis. The 338–360° F. fraction is charged to the silica-alumina catalyst under a pressure of 75 p. s. i and at a flow-rate of 3 to 4 liquid volumes per volume of catalyst per hour. The temperature of the reaction zone is maintained at 500–520° F. Approximately 20 per cent of the charge is depolymerized to olefinic products boiling in the $C_4$ to $C_8$ range. A negligible quantity of material boiling above 360° F. is produced.

The pretreated olefin fraction, with approximately the same boiling range as the original polymer fraction, is prepared for the mercaptan synthesis by blending it with hydrogen sulfide to give an olefin-hydrogen sulfide mol ratio of 1:1.5. A pressure of 1500 p. s. i. is employed in charging the blend to the silica alumina catalyst at a flow rate of three liquid volumes per volume of catalyst per hour. The reaction temperature is maintained at 300–350° F. The one-pass effluent is segregated into its components as described in Example I.

| | |
|---|---|
| Per cent olefin converted per pass | 75 |
| Per cent yield of high-boiling mercaptans based on olefin converted | 97 |
| Boiling range of mercaptan product | 425–460° F. |
| Mercaptan sulfur content of product, weight per cent | 15.5 |

It is to be understood that the invention should not be unduly limited by the above examples. As will be readily appreciated by one skilled in the art, various modifications of my invention may be practiced, in the light of the present disclosure and teachings, without departing from the scope or spirit of the claims.

I claim:

1. An improved process for the production of stable mercaptans of high molecular weight, which comprises subjecting a mixed propylene-butylene polymer fraction comprising a plurality of isomeric olefins of varying stabilities and having at least eight carbon atoms per molecule to partial selective depolymerization in a first reaction zone to effect a depolymerization of more unstable olefin constituents thereof, separating resulting low-boiling olefins from effluents of said first zone, and reacting remaining undepolymerized more stable olefins with hydrogen sulfide in a second reaction zone to form stable mercaptans having at least eight carbon atoms per molecule.

2. A process for producing stable mercaptans of high molecular weight, which comprises subjecting a mixed propylene-butylene polymer fraction boiling not lower than about 335° F. and not higher than about 400° F. and comprising a plurality of isomeric olefins of varying stabilities to the action of a depolymerization catalyst at a pressure of about atmospheric to 500 pounds per square inch, a temperature of about 400 to 800° F., and a flow rate such as to effect partial selective depolymerization of less stable olefins contained in said fraction, separating resulting low-boiling olefins from undepolymerized more stable olefins, reacting said more stable olefins with hydrogen sulfide in the presence of a mercaptan-synthesis catalyst and in amounts to give a molal ratio of hydrogen sulfide to olefin between about 1.1:1 and 2:1, at a pressure of about 1000 to 2000 pounds per square inch, a temperature of about 300 to 375° F., and a flow rate such as to effect a high per-pass conversion of said olefins to mercaptans having the same number of carbon atoms per molecule, and recovering as a product of the process a mercaptan fraction comprising stable mercaptans so produced having the same number of carbon atoms per molecule as olefins contained in said polymer fraction.

3. A process for producing stable mercaptans of high molecular weight, which comprises subjecting a mixed propylene-butylene polymer fraction boiling not lower than about 335° F. and not higher than about 400° F. and comprising a plurality of isomeric olefins of varying stabilities to partial depolymerization in the presence of a depolymerization catalyst to effect a selective depolymerization of less stable olefins contained therein, separating from effluents of said treatment an olefinic fraction comprising undepolymerized more stable olefins, reacting the last said olefinic fraction with hydrogen sulfide in the presence of a mercaptan-synthesis catalyst under reaction conditions to form mercaptans having the same number of carbon atoms per molecule, and recovering as a product of the process a mercaptan fraction comprising mercaptans so produced having the same number of carbon atoms per molecule as olefins contained in the first said polymer fraction.

4. The process of claim 1 in which said partial depolymerization and said mercaptan-forming reactions are each conducted in the presence of a synthetic gel catalyst of the silica-alumina type.

WALTER A. SCHULZE.